United States Patent [19]

Wiles

[11] 4,380,426
[45] Apr. 19, 1983

[54] INJECTION MOLDING VALVE PIN DIRECT PNEUMATIC ACTUATOR

[76] Inventor: William J. Wiles, R.R. 1, Cedar Valley, East Gwillinbury, Ontario, Canada

[21] Appl. No.: 399,730

[22] Filed: Jul. 19, 1982

Related U.S. Application Data

[63] Continuation-in-part of Ser. No. 353,014, Mar. 1, 1982.

[30] Foreign Application Priority Data

Feb. 24, 1982 [CA] Canada .................................. 396997

[51] Int. Cl.³ .............................................. B29F 1/05
[52] U.S. Cl. .................................................. 425/566
[58] Field of Search ................................ 425/564–566

[56] References Cited

U.S. PATENT DOCUMENTS 4,286,941  9/1981  Gellert ................................ 425/566
4,303,382 12/1981  Gellert ................................ 425/566

Primary Examiner—Thomas P. Pavelko
Attorney, Agent, or Firm—Riches, McKenzie & Herbert

[57] ABSTRACT

This invention relates to a valve gated injection molding system of the type where the melt passage enters the system on general alignment with the valve pin and cavity. The system has a novel valve pin actuating mechanism which is pneumatically operated according to a predetermined timed cycle. A piston which reciprocates in a cylinder has an outer collar portion from which a tongue portion extends inwardly to operatively engage the driven end of the valve pin. The melt passage extends through a portion of the back plate which, in turn, extends through the outer collar portion of the piston and is offset to leave room for the tongue portion of the piston to engage the driven end of the valve pin. Piston rings are located between the piston, back plate and cylinder to prevent excessive air leakage. This center entry system with a pneumatic actuating mechanism provides a more reliable mechanism which may be double acting.

9 Claims, 4 Drawing Figures

INJECTION MOLDING VALVE PIN DIRECT PNEUMATIC ACTUATOR

This application is a continuation-in-part of co-pending application Ser. No. 353,014 filed Mar. 1, 1982.

BACKGROUND OF THE INVENTION

This invention relates to valve gated injection molding and more particularly to an improved center entry system wherein the valve pin is directly pneumatically operated.

In the past, a variety of different mechanisms have been utilized to drive the valve pins of injection molding systems. The provision of suitable mechanism is considerably easier in multi-cavity systems such as those shown in the applicant's U.S. Pat. Nos. 4,013,393 which issued Mar. 22, 1977 and 4,212,627 which issued July 15, 1980. In these systems having a number of valve pins fed through a manifold arrangement from a common source, the melt flows in from the side and thus there is ample space for actuating mechanism to engage the driven end of the valve pins directly. In fact, in addition to using the lever and cam type drives disclosed in the above mentioned patents, it is even known to use pneumatic and hydraulic piston arrangements in direct alignment with the valve pins.

However, in center entry systems wherein a separate melt passage enters each system in general alignment with the valve pin and the gate, the space problem is much more severe. As may be seen from the applicant's U.S. Pat. Nos. 4,026,518 which issued May 31, 1977, 4,222,733 which issued Sept. 16, 1980, and 4,286,941 which issued Sept. 1, 1981, in systems of this type the melt passage must be offset around the driven end of the valve pin, leaving less room for the actuating mechanism. The mechanical linkage of these previous systems have the disadvantage that it wears considerably under the repeated loading to which it is subjected.

In addition, as described in the applicant's Canadian application Ser. No. 362,420 which was filed Oct. 15, 1980, it has become increasingly advantageous for certain applications for the actuating mechanism to be capable of double acting so that the valve pin may be driven open as well as driven closed. This allows opening to be timed independently of injection pressure which, in addition to avoiding valve pin sticking, in some applications reduces stressing of the material adjacent the gate area. Furthermore, it eliminates the requirement for a pressure shoulder and an enlarged portion of the valve pin which reduces sealing problems.

While pneumatic double acting mechanisms are known, they generally are located outside the melt passage and have the difficulty of transmitting the force to the valve pin, or else are space inefficient in that the melt passage must extend out around the piston. An example of the first type is shown in U.S. Pat. No. 3,677,682 to Putkowski which issued July 18, 1972.

SUMMARY OF THE INVENTION

Accordingly, it is an object of the present invention to at least partially overcome these problems by providing an improved injection molding system wherein the melt passage extends through the cylinder of the centrally located pneumatically operated piston which drives the valve pin.

To this end, in one of its aspects, the invention provides a valve gated center entry injection molding system comprising a heater cast seated in a cooled cavity plate, a gate through the cavity plate leading to a cavity, an elongated valve pin which reciprocates in a bore in the heater cast between open and closed positions, the valve pin having a driven end and a tip end which seats in the gate in the closed position, valve pin actuating mechanism, and a melt passage which receives pressurized melt from a molding machine at a center entry and extends through the heater cast to the gate, with the improvement wherein the valve pin actuating mechanism comprises a pneumatically operated piston which reciprocates in a cylinder generally in alignment with the valve pin and engages the driven end of the valve pin, the melt passage from the center entry to the gate disc extending through the piston cylinder.

In another of its aspects, the invention provides a valve gated center entry injection molding system comprising a heater cast seated between a back plate and cooled cavity plate, a gate through the cavity plate leading to a cavity, a melt passage which receives pressurized melt from a molding machine and extends from a center entry in the back plate through an offset portion of the back plate and the heater cast to the gate, an elongated valve pin which reciprocates in a bore in the heater cast with a central longitudinal axis in alignment with the gate and the center entry, the valve pin having a driven end and a tip end which seats in the gate in the closed position, and valve pin actuating mechanism, with the improvement wherein the valve pin actuating mechanism comprises a pneumatically operated double acting piston which reciprocates in a cylinder, the piston having an outer collar portion and a tongue portion, the outer collar portion encircling the back plate and sealingly received between the back plate and the cylinder, the tongue portion extending inwardly from the collar portion to operatively engage the driven end of the valve pin.

Further objects and advantages of the invention will appear from the following description taken together with the accompanying drawings.

DESCRIPTION OF THE PREFERRED EMBODIMENT

Figure 1:
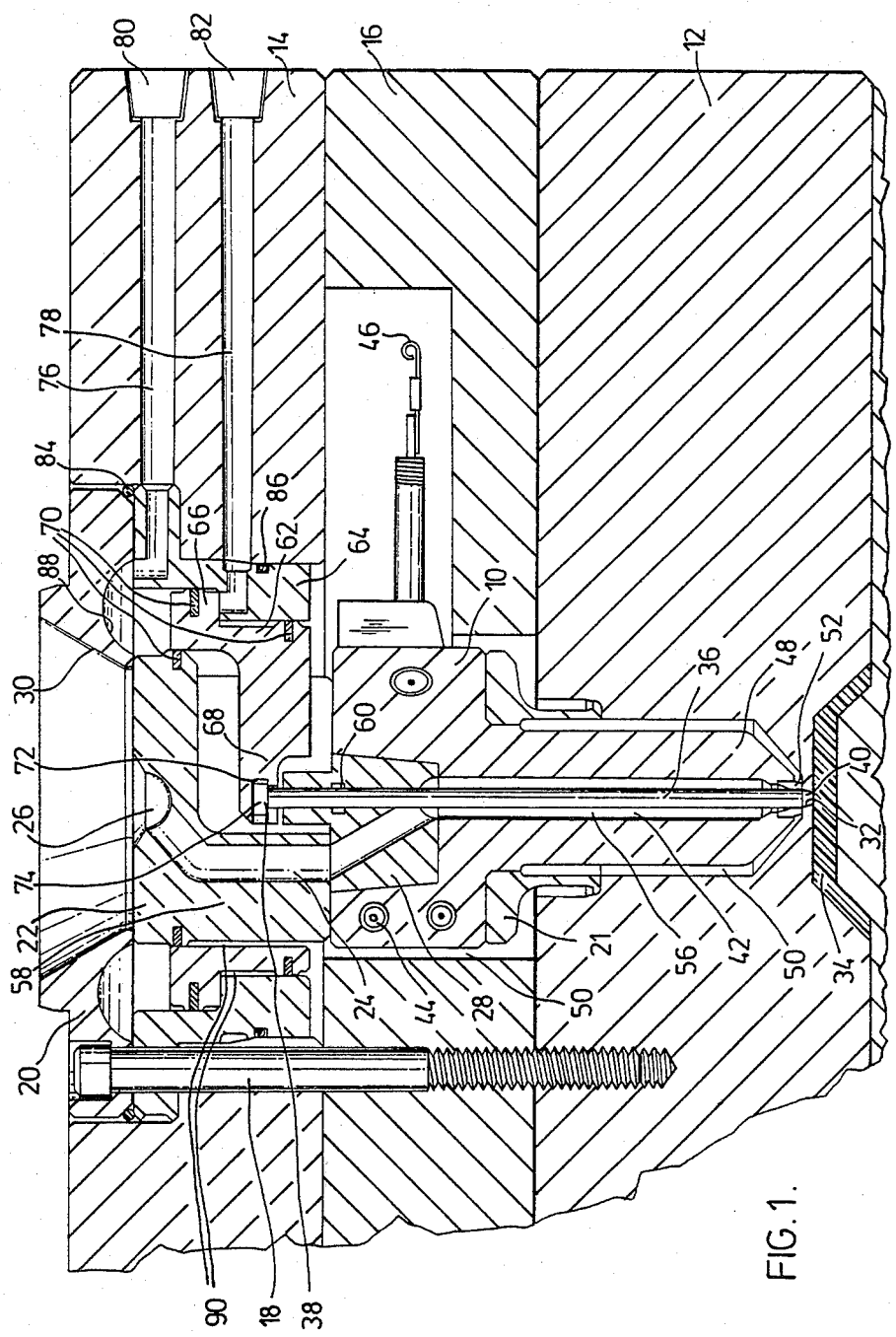
FIG. 1 is a sectional view of a valve gated injection molding system according to a preferred embodiment of the invention.
Figure 2:
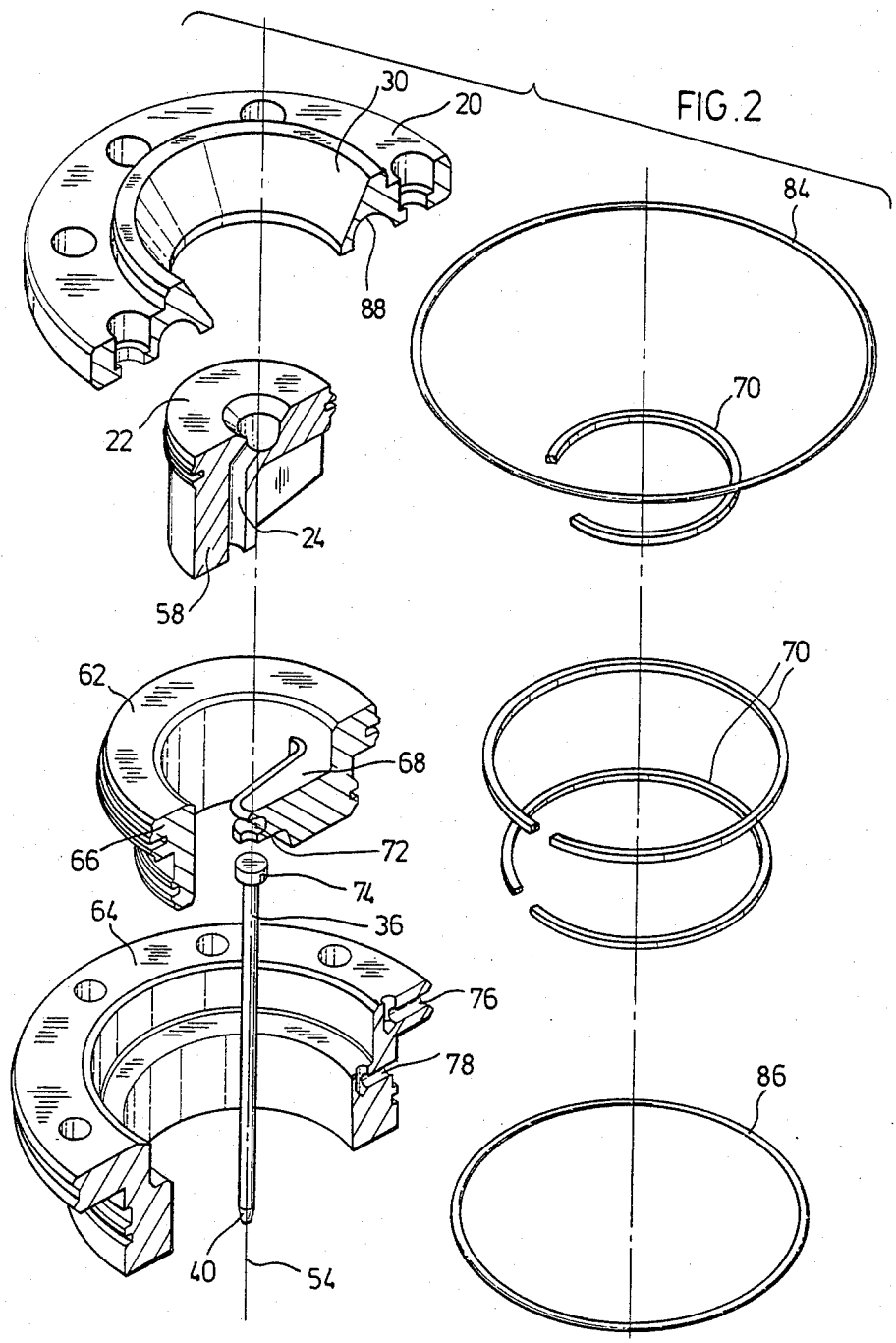
FIG. 2 is an exploded isometric view of a portion of the system seen in FIG. 1.

Reference is first made to FIG. 1, which shows a center entry valve gated injection molding system having a heater cast 10 seated in a cavity plate 12. The mold assembly has a collar section 14 fixed in position against a support plate 16 by bolts 18 which also extends through a locating ring 20. The heater cast 10 is located in the cavity plate 12 by an insulation bushing 21 and held in position by a back plate 22 which, in turn, is secured by the locating ring 20. A melt passage 24 extends from a center entry 26, through the back plate 22, through a valve-bushing seal 28 seated in the heater cast 10, and then through the heater cast itself. The locating ring 20 has an inner surface 30 which is bevelled to receive the nozzle of a molding machine (not shown) from which hot pressurized melt flows through the melt passage 24, through a gate 32 in the cavity plate 12 and into the cavity 34. An elongated valve pin 36 having a driven end 38 and a tip end 40 extends through a central bore 42 in the heater cast 10.

Temperature considerations are, of course, of critical importance to the satisfactory operation of the system. It is necessary to cool the cavity plate 12 by means (not shown), while the heater cast 10 is heated by an electric heating element 44 which is cast into it and receives power through terminal 46. The heater cast 10 has an extending nozzle portion 48 and is formed of a highly conductive material such as beryllium copper so that sufficient heat is conducted to maintain the pressurized melt at a uniform temperature as it flows through the melt passage 24. The insulation bushing 21 provides an insulative air space 50 between the hot heater cast 10 and the cool cavity plate 12. A generally cylindrical nozzle seal 52 is seated in the heater cast 10 to bridge the air space 50 around the gate 32. The nozzle seal 52 is formed of a titanium alloy and prevents the escape of the pressurized melt and minimizes heat loss in the gate area as described in the applicant's U.S. Pat. No. 4,043,740 which issued Aug. 23, 1977.

The enlongated valve pin 36 reciprocates along a central longitudinal axis 54 in the bore 42 in the heater cast. In the closed position the tip end 40 of the valve pin 36 is seated in the gate 32, and in the open position it is moved sufficiently to allow the melt to flow freely through the gate. As may be seen in FIG. 1, the bore 42 through the heater cast 10 has an enlarged portion 56 to continue the melt passage 24 around the valve pin 36. As mentioned above, in order to avoid having the molding machine offset from the valve pin 36 and cavity 34, it is necessary that the melt passage 24 extend around the driven end 38 of the valve pin 36. This is provided by the melt passage 24 extending from the center entry 26 through an offset portion 58 of the back plate 22 into the valve-bushing seal 28 seated in the heater cast 10. The central bore 42 for the valve pin 36 extends from the heater cast 10 through the valve-bushing seal, although it is reduced in size to close tolerance with the valve pin to prevent excessive leakage of the pressurized melt. A circumferential opening 60 is provided around the valve pin 36 with a vent to atmosphere (not shown) which relieves pressure and allows harmful gases and fluids (see page) to escape. The melt passage 24 joins the valve pin bore 42 in the valve-bushing seal at the beginning of the enlarged portion of the bore. As clearly described in the applicant's above mentioned U.S. Pat. No. 4,026,518, the bushing seal 28 avoids leakage between it and the abutting back plate 22 and facilitates the manufacture of structure wherein the melt passage 24 joins the valve pin bore 42.

The mechanism which actuates the valve pin 36 between the open and closed position is a pneumatically operated piston 62 seated in a cylinder 64. As may be seen the cylinder 64 is secured in position by the locating ring 20 and the bolts 18 which also extend through it. The piston 62 has an outer collar portion 66 and an integral tongue portion 68 which extends inwardly from it. The collar portion 66 is received between the cylinder 64 and the back plate 22, and piston rings 70 are provided to provide a pneumatic seal as the piston reciprocates. The tongue portion 68 extends into the space provided by the offset portion 58 of the back plate 22 and has a slot 72 which receives the enlarged head 74 of the driven end 38 of the valve pin 36. Air conduits 76,78 are drilled through the cylinder 64 and the collar section 14 to extend from external connections 80,82 to opposite sides of the collar portion 66 of the piston 62. O-rings 84,86 are provided between the cylinder 64 and the collar section 14 of the mold to prevent excessive air leakage. The locating ring 20 is shaped with a concave surface 88 to provide access for the air, as well as to minimize heat loss from the back plate 22 through the cylinder 64. Additional air spaces 90 are also provided between the piston 62 and the cylinder 64 adjacent the piston rings 70 for the same purpose. In this embodiment, the piston 62 is made of H13 hot work steel, the cylinder 64 is a fine grain casting, and the piston rings 70 are chrome plated high performance rings.

In use, the system is assembled as described and illustrated and power is applied to the heating coil 44 to bring it up to operating temperature. An external air source of about 100 psi. (not shown) is hooked to external air connections 80,82 with valves controlled by a timing circuit which applies and releases the pressure in a repetitive timed sequence in conjunction with the application of pressure to the melt from the molding machine. With the valve pin 36 in the open position, melt pressure is applied to inject melt through the hot melt passage 24 and gate 32 to fill the cavity 34. After maintaining the melt pressure for a short period to pack the cavity, the air pressure is switched to drive the piston 62 and the valve pin 36 to the closed position shown in FIG. 1, and the melt pressure is released. This position is held for a few seconds for cooling and the mold is then opened to eject the finished product. The mold is then closed and the air pressure reversed to open the valve pin 36 before the melt pressure is reapplied. This sequence is repeated several times per minute, with the exact timing of each step and the temperature and pressures depending upon the type of material and the product. As may be seen, the tongue portion 68 of the piston 62 which applied the operating force to the valve pin 36 forms a lever arm which exerts a tongue on the piston 62. However, this is offset by the shape of the outer collar portion 66 which distributes the force from the air pressure around the valve pin 36 to avoid any problem of jamming.

Figures 3, 4:
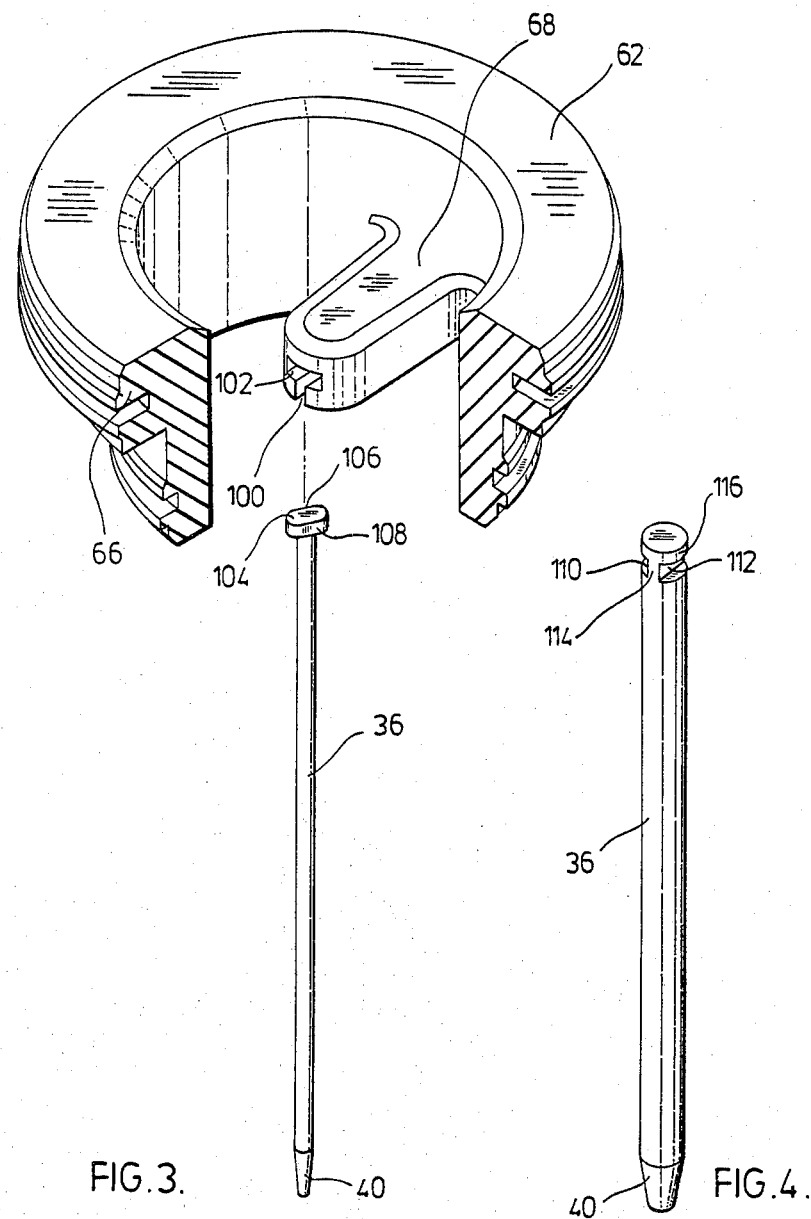
FIG. 3 is a cut-away isometric view of a piston and a valve pin according to an alternate embodiment of the invention.
FIG. 4 is an isometric view of a valve pin according to another embodiment for use with a piston as seen in FIG. 3.

Reference is now made to FIG. 3 which shows a piston and valve pin configuration according to an alternate embodiment of the invention. This structure provides that the valve pin is secured against rotation during operation of the system which is desirable for certain molding applications so that the tip end of the valve pin may be compatible with a grain or pattern in the molded product.

The piston 62 shown in FIG. 3 is essentially the same and operates the same as that described above except that the tongue 68 has a different configuration. In this embodiment, the tongue 68 has a slot 100 which leads to a larger channel 102 with a uniform rectangular cross section. As may be seen, the valve pin 36 has an enlarged oblong shaped head 104 with flat parallel sides 106 and 108 which is made to size to be snugly slid into the channel 102 in the piston tongue. In use, the system is assembled with the valve pin head 104 received in the channel 102 which, of course, prevents the valve pin from rotating during use.

FIG. 4 illustrates an embodiment in which the valve pin 36 has a pair of notches 110 and 112 oppositely located near its driven end 38. This configuration of the valve pin is used with the piston shown in FIG. 3 when the valve pin has a larger diameter. The notches 110 and 112 are made so that the neck 114 formed between them snugly fits into the slot 100 in the tongue and the head portion 116 between the neck and the end is received in the channel 102. The operation of this embodiment is, of course, similar to that described above, but this structure of the piston 62 and the valve pin 36 prevents the valve pin from rotating during use.

Although the description of this injection molding system has been given with respect to a particular embodiment, it is not to be construed in a limiting sense. Variations and modifications will occur to those skilled in the art. In particular, it is apparent that the configurations of the piston, cylinder, back plate and heater cast may be varied considerably. Furthermore, while a double acting structure as described and illustrated, it may easily be adapted to be single acting by altering the connection between the piston and the valve pin for applications where this may be suitable. For a definition of the invention, reference is made to the claims.

What I claim is:

1. In a valve gated center entry injection molding system comprising a heater cast seated in a cooled cavity plate, a gate through the cavity plate leading to a cavity, an elongated valve pin which reciprocates in a bore in the heater cast between open and closed positions, the valve pin having a driven end and a tip end which seats in the gate in the closed position, valve pin actuating mechanism, and a melt passage which receives pressurized melt from a molding machine at a center entry and extends through the heater cast to the gate, the improvement wherein;

the valve pin actuating mechanism comprises a pneumatically operated piston which reciprocates in a cylinder generally in alignment with the valve pin and engages the driven end of the valve pin, the melt passage from the center entry to the gate disc extending through the piston cylinder.

2. An injection molding system as claimed in claim 1 wherein the piston is double acting and the piston operatively engages the driven end of the valve pin to drive it in both directions.

3. An injection molding system as claimed in claim 1 wherein the piston has an outer collar portion and a centrally extending tongue portion, the collar portion operatively received inside the cylinder and the tongue portion extending inwardly from the collar portion to engage the driven end of the valve pin.

4. An injection molding system as claimed in claim 2 wherein the melt passage extends from the center entry through a back plate to the heater cast, the back plate having a centrally offset portion which extends into abutment against the heater cast, and the outer collar portion of the piston encircles the back plate and is sealingly received between the back plate and the cylinder.

5. An injection molding system as claimed in claim 3 wherein the offset portion of the back plate abuts against a bushing seal seated in the heater cast, the melt passage extending into the bushing seal to join the valve pin bore which extends through the bushing seal, the valve pin bore having an enlarged portion to conduct the melt around the valve pin to the gate.

6. An injection molding system as claimed in claim 5 wherein sealing means are provided between the back plate and the collar portion of the piston and between the collar portion of the piston and the cylinder.

7. In a valve gated center entry injection molding system comprising a heater cast seated between a back plate and a cooled cavity plate, a gate through the cavity plate leading to a cavity, a melt passage which receives pressurized melt from a molding machine and extends from a center entry in the back plate through an offset portion of the back plate and the heater cast to the gate, an elongated valve pin which reciprocates in a bore in the heater cast with a central longitudinal axis in alignment with the gate and the center entry, the valve pin having a driven end and a tip end which seats in the gate in the closed position and valve pin actuating mechanism, the improvement wherein;

the valve pin actuating mechanism comprises a pneumatically operated double acting piston which reciprocates in a cylinder, the piston having an outer collar portion and a tongue portion, the outer collar portion encircling the back plate and sealingly received between the back plate and the cylinder, the tongue portion extending inwardly from the collar portion to operatively engage the driven end of the valve pin.

8. An injection molding system as claimed in claim 7 wherein piston rings are provided between the back plate and the collar portion of the piston and between the collar portion of the piston and the cylinder.

9. An injection molding system as claimed in claim 3 wherein the tongue portion of the piston has channel means and the valve pin has a head portion adjacent the driven end, the head portion being operatively received in the channel means whereby rotation of the valve pin is substantially prevented during operation of the system.

* * * * *